Nov. 29, 1949     C. L. JOHNSON     2,489,417
LANDING GEAR STABILIZING APPARATUS FOR AIRCRAFT
Filed Nov. 14, 1947     2 Sheets-Sheet 1
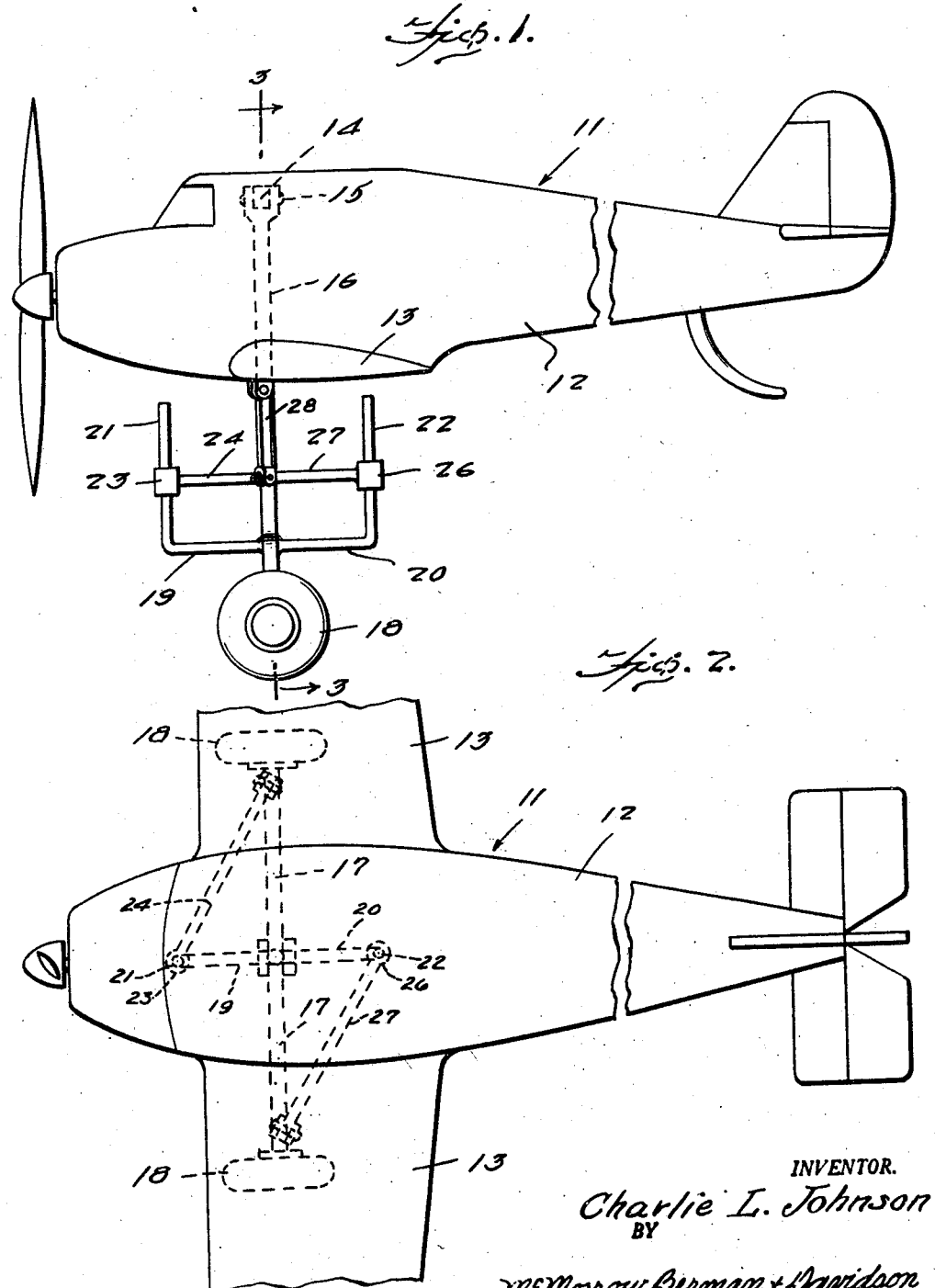
INVENTOR.
Charlie L. Johnson
BY
McMorrow, Berman & Davidson
ATTORNEYS Nov. 29, 1949          C. L. JOHNSON          2,489,417
LANDING GEAR STABILIZING APPARATUS FOR AIRCRAFT
Filed Nov. 14, 1947          2 Sheets-Sheet 2
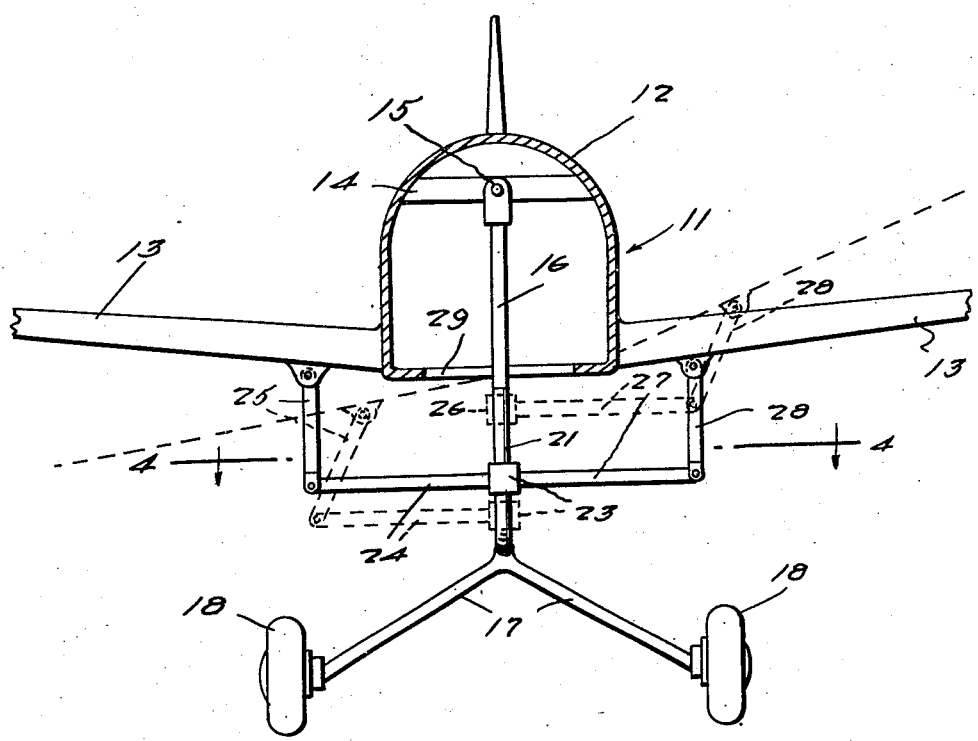
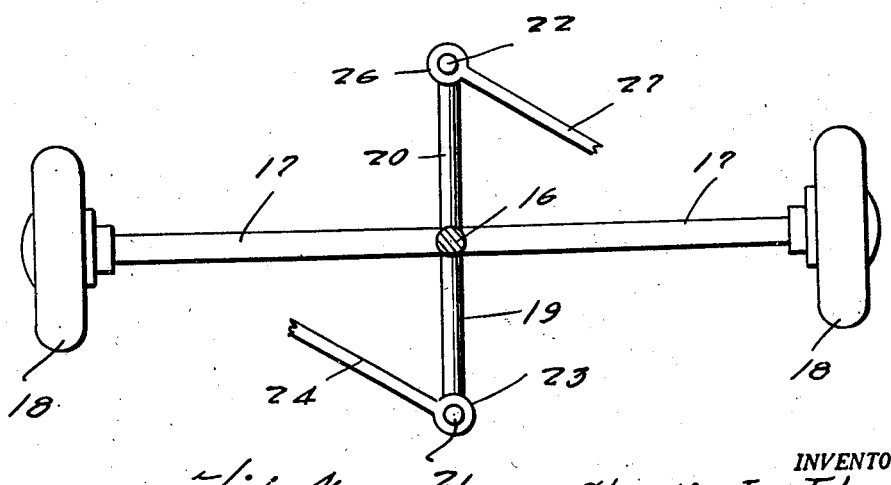
INVENTOR.
Charlie L. Johnson
BY
McMorrow, Berman & Davidson
ATTORNEYS Patented Nov. 29, 1949

2,489,417

UNITED STATES PATENT OFFICE 2,489,417

LANDING GEAR STABILIZING APPARATUS FOR AIRCRAFT

Charlie L. Johnson, Alexandria, La.

Application November 14, 1947, Serial No. 786,096

2 Claims. (Cl. 244—103)

1

This invention relates to aircraft landing gear and more particularly to an apparatus for maintaining the aircraft landing gear in a level position while the aircraft is landing or taking off under adverse cross-wind conditions.

A main object of the invention is to provide a novel and improved landing gear stabilizing means for aircraft which automatically functions to maintain the landing gear wheels on horizontal axes regardless of the tilting of the aircraft from side-to-side due to adverse wind conditions or other causes, said stabilizing means being very simple in construction, easy to install and reliable in operation.

A further object of the invention is to provide an improved landing gear stabilizer which functions gravitationally to maintain the landing gear of an aircraft in correct ground-engaging position during such times as the aircraft is tilted around its longitudinal axis, as for example, by cross-winds during take-off or during landing of the aircraft, whereby the safety of operation of the aircraft is greatly increased.

Further objects and advantages of the invention will become apparent from the following description and claims, and from the accompanying drawings, wherein:

Figure 1 is a side elevational view of an airplane equipped with a landing gear stabilizing apparatus constructed in accordance with the present invention.

Figure 2 is a fragmentary top plan view of the airplane of Figure 1.

Figure 3 is a transverse vertical cross-sectional view taken on line 3—3 of Figure 1.

Figure 4 is an enlarged horizontal cross-sectional view taken on line 4—4 of Figure 3.

Referring to the drawings, 11 designates an airplane having a fuselage 12 of conventional shape and the conventional monoplane wings 13, 13. Secured in the upper forward portion of fuselage 12 in a transverse plane rearwardly adjacent the transverse plane of the leading edges of wings 13, 13 is a horizontal bar member 14. Pivotally secured at 15 to the mid-point of bar member 14 for free swinging movement in the transverse plane of bar member 14 is a depending arm 16 passing through a transverse slot 29 formed in the bottom wall of fuselage 12. Secured rigidly to the lower end of arm 16, and preferably integral therewith, are divergent rod members 17, 17 also in the transverse plane of bar member 14. Journaled to the ends of rod members 17, 17 are the respective landing wheels 18, 18.

2

Secured rigidly to the lower portion of arm 16, and preferably integral therewith are respective forwardly and rearwardly extending horizontal arms 19 and 20, located in the vertical longitudinal central plane of the aircraft. At the end of forwardly extending arm 19 is a vertical upwardly extending bar portion 21 and at the end of rearwardly extending arm 20 is a similar vertical upwardly extending bar portion 22.

Designated at 24 is an arm having integral therewith at one end a collar 23. Collar 23 is slidably mounted on bar portion 21. The other end of arm 24 is connected by a link 25 to the underside of one of the wings 13, the pivotal connection of said link 25 to the wing being in the transverse plane of bar member 14 but the pivotal axis of said connection being transverse to the link. Designated at 27 is an arm having integral therewith at one end a collar 26. Collar 26 is slidably mounted on bar portion 22. The other end of arm 27 is connected by a link 28 to the underside of the other wing 13, the pivotal connection of said link 28 being also in the transverse plane of bar member 14 and the pivotal axis thereof being transverse to said link 28. Collars 23 and 26 are free to move up and down on the respective vertical arms 21 and 22, whereby the arms 24 and 27 are free to adjust themselves vertically with respect to said vertical arms 21 and 22.

During landing or take-off of the airplane the wings 13, 13 may be tilted either clockwise or counter-clockwise around the longitudinal axis of the airplane by cross-winds or by other causes. When this occurs arm 16 swings to a vertical position by the gravitational force exerted thereon by arms 17, 17 and wheels 18, 18, the swinging movement thereof being damped by the friction between the collars 23, 26 and the respective vertical arms 21 and 22. The wheels 18, 18 therefore automatically swing to a level position without oscillation and simultaneously engage the ground when the airplane is landing, or remain in contact with the ground during simultaneous periods when the airplane is taking off.

Referring to Figure 3, when the wings 13, 13 are tilted clockwise, link 28 exerts a downward thrust on arm 27 and link 25 exerts an upward pull on arm 24, assuming the wheels 18, 18 to be in contact with the ground. The frictional resistance of the collars 26 and 23 on the vertical arms 22 and 21 cushions and retards the clockwise tilting movement of the wings and the fuselage 11 with respect to the wheels 18, 18. Conversely, when the wings are tilted counterclockwise, as shown in dotted view in Figure 3, there is a downward thrust exerted by link 25 on arm 24 and an upward pull exerted by link 28 on arm 27. The frictional resistance of the collars 26 and 23 to vertical movement on the arms 22 and 21 again cushions and retards the tilting motion of the fuselage with respect to the wheels.

When tilting of the wings 13, 13 occurs with the wheels 18, 18 out of contact with the ground, arm 16 swings to a vertical position by gravity, as above described, and again the swinging movement between the fuselage and the wheels is damped and retarded by the friction between the collars 26 and 23 and the vertical arms 22 and 21.

When the aircraft is travelling over uneven ground, the wheels 18, 18 will automatically shift in relative elevation without disturbing the balance of the airplane. The swinging movement of the wheels with respect to the airplane will be cushioned, however, by the frictional damping afforded by the cooperation of the slidable collars 23 and 26 with the upstanding arms 21 and 22.

The bar member 14 is preferably located well above the center of gravity of the airplane so that the airplane will be supported in a stable manner on the wheels 18, 18.

While a specific embodiment of a landing gear stabilizing structure for aircraft has been disclosed in the foregoing description, it will be understood that various modifications within the spirit of the invention may occur to those skilled in the art. Therefore, it is intended that no limitations be placed on the invention except as defined by thes cope of the appended claims.

What is claimed is:

1. In an aircraft, a depending arm pivotally secured for transverse swinging movement to the upper portion of the aircraft, fuselage in the longitudinal vertical plane of the aircraft, a pair of laterally extending axle elements carried by the lower end of said arm below the fuselage and symmetrical with respect to said longitudinal plane, ground-engaging wheels journaled on the ends of the axle elements, a frame carried by said depending arm, said frame having a pair of vertical members, and link means slidably connected to the respective vertical members and pivotally secured to respective laterally disposed portions of the aircraft on each side of said longitudinal plane.

2. In an aircraft, a depending arm pivotally secured for transverse swinging movement to the upper portion of the aircraft fuselage in the longitudinal vertical plane of the aircraft, a pair of laterally extending axle elements carried by the lower end of said arm below the fuselage and symmetrical with respect to said longitudinal plane, ground engaging wheels journaled on the ends of the axle elements, a longitudinal frame carried by the lower portion of said arm and having a first member projecting upwardly therefrom forwardly of the arm and a second member projecting upwardly therefrom rearwardly of said arm, a first rod slidably secured to said first member, a link connecting said first rod to one of the aircraft wings, a second rod slidably connected to said second member, and another link connecting said second rod to the other wing of the aircraft.

CHARLIE L. JOHNSON.

REFERENCES CITED

The following references are of record in the file of this patent:

UNITED STATES PATENTS

| Number | Name | Date |
|---|---|---|
| 1,988,093 | Steward | Jan. 15, 1935 |

FOREIGN PATENTS

| Number | Country | Date |
|---|---|---|
| 264,254 | Germany | Sept. 18, 1913 |